United States Patent Office 3,473,663
Patented Oct. 21, 1969

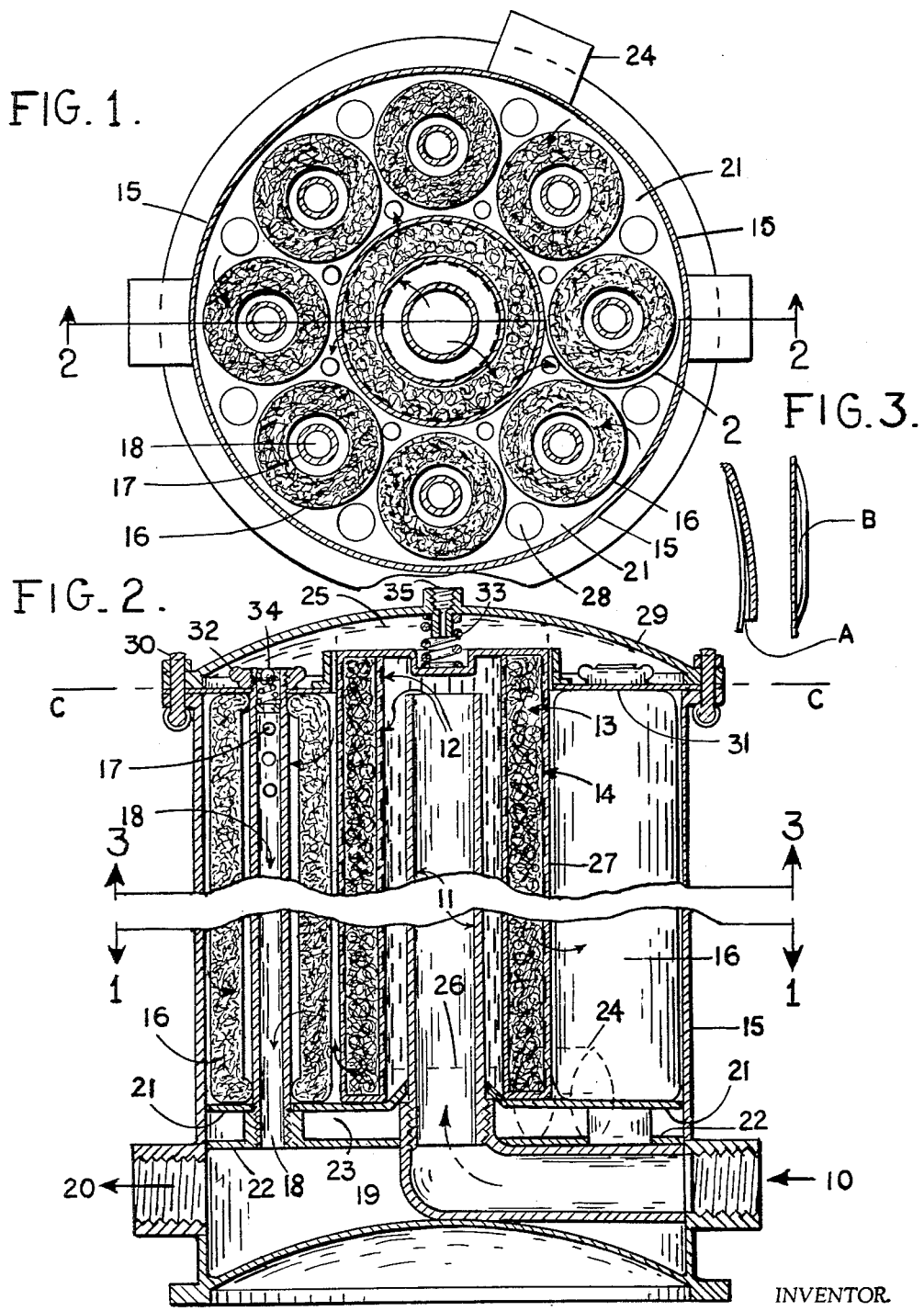

3,473,663
MULTIPLE FILTER ELEMENT FLUID PURIFYING SYSTEM
Charles A. Winslow, 3009 Golden Rain Road No. 9-11, Walnut Creek, Calif. 94529
Filed Sept. 11, 1967, Ser. No. 666,884
Int. Cl. B01d 35/02, 35/00
U.S. Cl. 210—120                10 Claims

ABSTRACT OF THE DISCLOSURE

A liquid purifying system wherein contaminated fluid is caused to flow up into a vertically disposed central primary inlet pipe into a relatively course filter, coalescer and coagulator at the inside top center thereof and then pass out and down to the exterior of a secondary series of fine in-flow final filter elements to a clean fluid outlet. A sump and drain are provided at the bottom of the filter elements for drainage and the said filter elements can be changed through a removable cover plate.

---

The present invention relates to improvements in fluid filters, wherein moisture, water, acid, etc., is primarily treated and/or removed from oil before it is finally filtered. This combined out-flow coalescer and coagulator and also in-flow filter is constructed as a single unit, wherein the fluid to be cleaned is first, passed from the central inlet through a coalescing and chemical treatment unit with an inside-out flow. This primary stage of treatment is for the dual purpose of coalescing and coagulating moisture or water, acid, gum, etc., into relatively large droplets which issue at a low flow rate from a large exterior area. These droplets are therefore effected by gravity and tend to settle in the bottom of the filter sump.

Furthermore, since the exterior surface of the final inflow plural filtering units in normal operation are coated with oil and sludge, the surface tension of the water droplets tends to prevent penetration of the outer filter surface and further aids coalescence of moisture until gravity finally causes the enlarged particles to settle into the filter sump.

Another important feature of the invention is that during the primary stage of cleaning and treatment the differential pressure is limited to prevent flushing water through the unit and possibly washing out fluid treatment chemicals stored within the unit.

Another important feature of the invention is that, as the fluids enter centrally and pass out radially through the primary stages of cleaning and chemical treatment, any undue high flow or resistance through same causes the coalescing and coagulating unit to rise vertically and to by-pass heavy collected deleterious material directly into the bottom sump area, this action is further accelerated by the down flow washing action of the fluid entering from the top of the centrally disposed inlet tube.

Another important feature of the invention is, that when the unit is used as an engine lubricating oil filter, by passing of the final filtering stages for any cause takes place at the cleanest, highest spot in the unit, the same is true of air removal from the unit, whether it is used either as a fuel or lubricant filter.

Another important feature of the invention is that all of the final filtering elements and the perforated metal encased primary element shown can be constructed of various materials formed and treated to suit any type of fluid purification. For instance, I have shown treated compressed cotton and/or excelsior or sisal etc., in the final stages as contained within a knitted tubing, formed in shape and dimensions to fit the filtering assembly. The same process can be used in forming the primary filtering, coalescing and chemical treated primary central single hollow unit. However, on the drawings I have shown as a preferred form a perforated double walled hollow container as I may use a purifying material for certain purposes, that may decompose in use with a reduced volume; thus a solid walled container would retain its dimensions and form better than a unit made from knitted fabric etc.

Another important feature of the invention is that it is only necessary to remove the cover to change the complete filtering assembly, either as individual units or as a complete assembly, including the perforated bottom plate on which the total filtering unit assembly rests. Thus with the primary coalescer and multple final filtering units removed the filter shell can be readily drained and flushed clean through the sump drain.

With the foregoing and other objects in mind, I draw attention to the drawings illustrating the above mentioned and other novel features of the device wherein:

FIGURE 1 is a view in horizontal section taken along the line 1—1 of FIGURE 2, looking in the direction indicated by the arrows.

FIGURE 2 is a broken view in vertical elevation and in section taken along the irregular line 2—2—2 of FIGURE 1, looking in the direction indicated by the arrows. The line 3—3 at the broken section indicates that the invention can be made in any length with single filtering units on each outlet tube or a stack of multiple filtering units as best suits any individual installation.

FIGURE 3 illustrates an enlarged view of a preferred method of perforating the shell or container of the primary coalescing unit wherein A is a horizontal view illustrating the lip of the openings and B illustrates the corresponding length of the preferred slit like openings used on all vertical walls of the coalescer unit.

It is to be further understood that the invention can be used to filter any fluid that will readily flow through the unit, but is primarily and best suited for filtering and purifying engine lubricating oil and/or fuel oil of any grade or viscosity that will readily flow through the unit without undue back pressure.

For instance, in operation and assuming that the unit is connected to the Full-Flow lubricating system of a conventional diesel engine, wherein the inlet of the filtering and purifying unit is connected to the lubricant pump discharge and all of the lubricating oil passes through the unit before it reaches the engine bearings, in this case dirty used oil passes into the inlet 10, and up through and out the top of the pipe 11, then down and out through the perforated or porous casing 12, into and through the core of the primary coalescer 13, containing material suitable for causing coalescing of moisture and also chemical treatment of deleterious substances that are carried by the lubricating oil, such as acid, gum, varnish and moisture etc., caused from the fuel used and the products of combustion, thus corrosion and wear of engine bearing surfaces is prevented.

Thus following the primary process of coarse filtering, coalescing and chemical treatment the fluid to be filtered, passes at greatly reduced velocity through a relatively greater area and a plurality of more dense filtering units to remove soot, grit, gum, varnish, scale and metal wear particles as follows; after the fluid passes through the inner perforated casing 12, processing and acid neutralizing material 13, and the outer wall 14, it is under pressure within the filter housing 15, and flows at reduced velocity through the final filtering elements shown in section and full view at 16, to be central perforated outlet tubes 17, as is indicated by the arrows, thence down through the tubes to vertical outlet passages 18, and into the bottom clean fluid sump 19, and finally to the clean outlet 20.

It is to be understood that the removable perforated element support plate 21, and sump solid bottom plate 22, comprise a relatively quiescent zone 23, for the collection of deleterious material which can be drained and/or cleaned through the outlet 24.

In operation as a Full-Flow lubricant filter with fluid continuously flowing into the inlet 10, through the unit and thence out of the outlet 20, it is necessary to always supply the engine bearings with lubricant, regardless of whether it is perfectly filtered or not, therefore by-pass valves are provided on both the primary coalescing and final filtering units.

For example, the dotted lines 25 and 26 indicate the raised up or by-pass position of the primary spring pressed unit 27, thus providing a free passage of untreated fluid which is spread evenly over the bottom multiple perforated element support and sump cover plate 21, thus any heavy material can readily pass through the multiple perforations or holes 28, into the quiescent sump area 23.

Regarding the final filtering units 16, by-passes are provided in the cleanest spot within the casing 15, at the very top, under the top domed cover 29, which is held down by swing bolts 30, thus clamping the top gasketed element support plate 31, oil tight to the upper flange of the casing 15, as indicated at line C—C. Clamps 32, are provided to compress the final filtering elements 16, in place and a top spring 33 compresses the primary unit 14 against the removable perforated bottom plate 21, which also forms a seat for the vertically movable unit 14. Conventional ball checks or equivalent valve means 34, are provided for the top of each outlet tube 17. A vent is normally provided at 35, to bleed off air or gas as required.

Referring to the line C—C it is to be understood that as shown, the removable top perforated plate 31 in operation permits all finally by-passed fluid to pass up through holes 28 (which match holes 28 in plate 21 at the bottom) to outlets indicated at 34 and tubes 17. It is to be understood that said by-pass means, may be modified as installed on the plate 21 instead of the plurality of outlet tubes 17. All elements primary and final are removable when the cover 29 is removed. The final filtering element 16 can be removed as an assembly with the perforated plate 31 or separately as desired by simply removing the clamp nuts 32 from the outlet tubes 17, and removing the parts from the casing 15 separately for cleaning and/or replacement.

It is to be further understood that the foregoing drawings and description clearly describes my invention but I do not wish to limit myself to the form and details illustrated and described for the obvious reasons that various changes in dimensions and construction details may be resorted to without departing from the spirit and scope of the invention. Furthermore, I have described my invention in its preferred form as a two stage filtering system preferably for cleaning and purifying lubricating or fuel oil etc. I anticipate that with slight modifications the novel filtering and purifying system shown and described can be used to purify fluids to any degree through multiple stages of my fluid purifying invention.

Therefore having thus described and illustrated my invention what I claim is:

1. A fluid purifying system comprising a cylindrical hollow compartmented casing with a removable cover, a filtering compartment attached to and centrally supported by said casing, said filtering compartment comprising a central vertically disposed inlet tube with the discharge toward the filtering compartment near the top, said filtering compartment provided with a centrally disposed primary outflow tubular coalescing and coagulating element and a plurality of circularly composed inflow tubular porous secondary filtering elements, all of said elements being removable through the top of said casing with the cover removed.

2. Claim 1 including said purifying system comprising a primary and a secondary by-pass on the fluid passing therethrough.

3. Claim 1 including said primary and said secondary by-pass each operating on separate and varying pressure zones within the filter.

4. Claim 1 including said primary outflow tubular coalescing and coagulating element being free floating vertically and controlled by fluid velocity and volume passing through the filter.

5. Claim 1 including, said cylindrical hollow compartmented casing, during operation having a top compartment containing primary cleaned fluid and an air separator therein, the central sectional section comprising a primary and secondary filtering section, above a sump section and the lowermost section containing clean filtered fluid and an outlet.

6. Claim 1 including said primary outflow tubular coalescing and coagulating element adapted to be guided by and slideable on said vertically disposed inlet tube with the discharge toward the top thereof.

7. Claim 1 including, said purifying system comprising a concave bottom forming the bottom of the clean fluid sump, a top plate fastened to the walls of said compartmented casing and forming a top for said fluid compartment, said top plate provided with perforated outlet tubes from the final clean fluid outlet tubes within said tubular hollow compartmented casing.

8. Claim 1 including, said purifying system comprising a concave bottom forming the bottom of the clean fluid compartmented sump, a top plate fastened to the walls of said compartmented casing and forming a top for said clean fluid compartment, said top plate provided clamping means to maintain said secondary filtering elements in secure spaced relation during use.

9. Claim 1 including a fluid purifying system with a floating porous screened inlet slideable mounted on a fixed central inlet tube.

10. Claim 1 including, said centrally vertical disposed inlet tube and said outflow floating tubular coalescing and coagulating element serves to shunt sludge down and into the sludge sump and drain.

References Cited

UNITED STATES PATENTS

| | | | |
|---|---|---|---|
| 2,545,374 | 3/1951 | Nugent | 210—130 |
| 2,707,563 | 5/1955 | Kasten et al. | 210—23 X |
| 2,975,901 | 3/1961 | Tischer | 210—132 |
| 3,065,854 | 11/1962 | Winslow | 210—130 |
| 3,229,817 | 1/1966 | Pall | 210—130 |
| 3,256,997 | 6/1966 | Pall et al. | 210—494 |
| 3,268,077 | 8/1966 | Ball | 210—131 |
| 3,283,477 | 11/1966 | Kasten | 210—315 X |

FOREIGN PATENTS

| | | |
|---|---|---|
| 790,789 | 2/1958 | Great Britain. |
| 851,677 | 10/1960 | Great Britain. |

REUBEN FRIEDMAN, Primary Examiner

F. A. SPEAR, Jr., Assistant Examiner

U.S. Cl. X.R.

210—131, 132, 134, 300, 307, 316, 323, 438